June 5, 1928.
W. G. BLAKE
1,672,243
BUMPER
Filed April 18, 1927 2 Sheets-Sheet 1
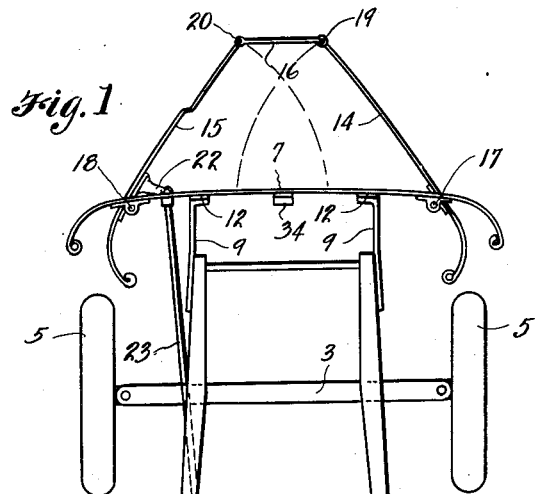
Fig. 1
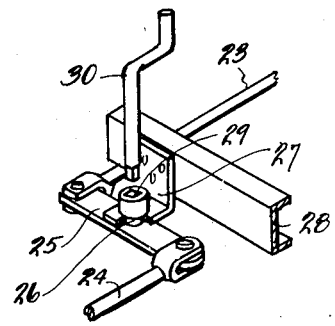
Fig. 2
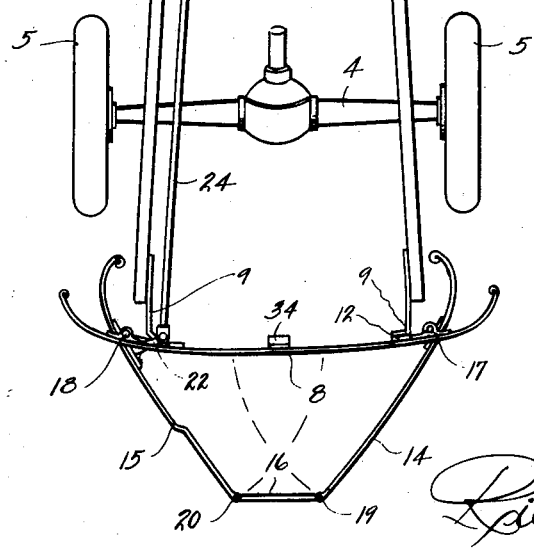
INVENTOR
W. G. BLAKE
BY
Richard J. Cook
ATTORNEY June 5, 1928.                                                               1,672,243
W. G. BLAKE
BUMPER
Filed April 18, 1927            2 Sheets-Sheet  2
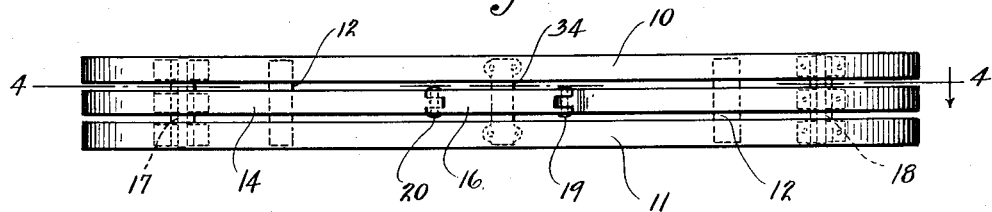
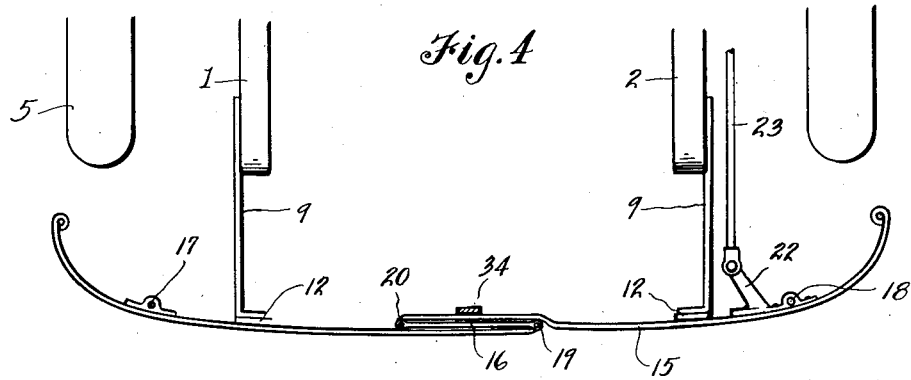
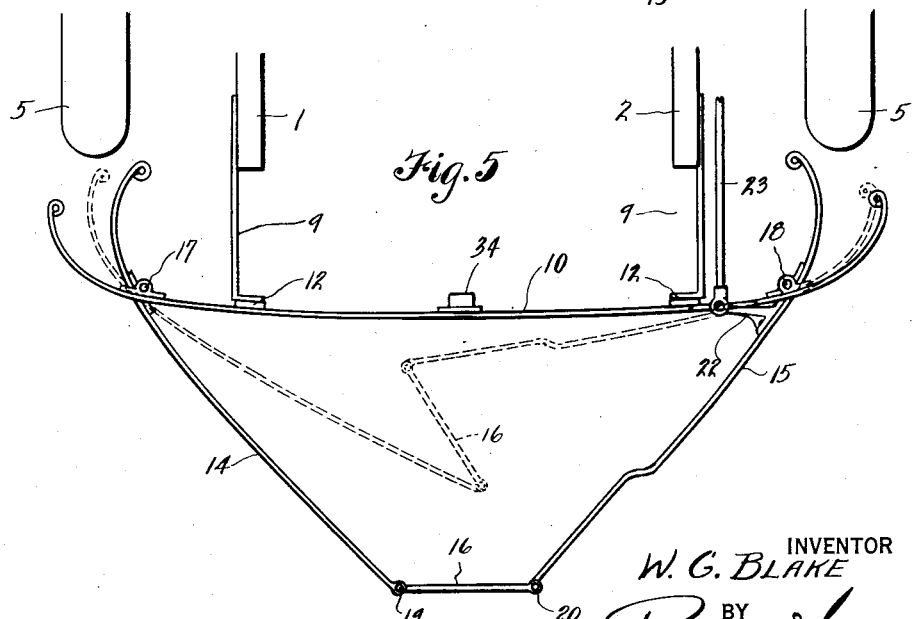

Patented June 5, 1928.

1,672,243

UNITED STATES PATENT OFFICE.

WILLIAM GEORGE BLAKE, OF SEATTLE, WASHINGTON, ASSIGNOR OF ONE-HALF TO BERT M. FILMER, OF VANCOUVER, BRITISH COLUMBIA, CANADA.

BUMPER.

Application filed April 18, 1927. Serial No. 184,684.

This invention relates to improvements in vehicle bumpers, and particularly to bumpers of that character designed for use on automobiles of the passenger carrying type, although not limited thereto; it being the principal object of the invention to provide bumpers that may be mounted rigidly at the front and rear ends of an automobile for the purpose of preventing or lessening the danger of damage to the vehicle by collision, and which also embody certain parts that may be adjusted from their normal, retracted positions to extended positions at which they serve, when the vehicle is parked or standing, as means for limiting the closeness to which other vehicles may approach in parking and which provide sufficient clearance when these parts are retracted that no difficulty will be experienced in getting the vehicle out from the parking line.

It is also an object of the invention to provide bumpers of the above character in which the extendible and retractable parts are operable, or controlled, by mechanism that is accessible from the driver's seat in the vehicle.

A further object of the invention is to so construct the extendible parts of the bumper that when in retracted position they will lie even with the rigid cross bars and when in extended position they will not be so disposed as to be caught, bent or damaged by other vehicles in parking or when leaving the parking line.

Other objects of the invention reside in the various details of construction, the combination of parts, and in their mode of operation as is hereinafter described.

In accomplishing these objects, I have provided the improved details of construction, the preferred forms of which are illustrated in the accompanying drawings, wherein—

Figure 1 is a plan view of an automobile equipped at the front and rear ends with bumpers in accordance with details of the present invention; showing the adjustable parts of the bumpers in extended positions; the vehicle body being omitted for the purpose of better illustration.

Figure 2 is a perspective view of the control mechanism operable from the driver's seat for actuating the bumper parts between retracted and extended positions.

Figure 3 is a front elevation of a bumper constructed according to the present invention.

Figure 4 is a horizontal section taken on the line 4—4 in Figure 3.

Figure 5 is a plan view of the bumper, showing the adjustable parts in extended position.

Referring more in detail to the drawings—

1 and 2 designate the opposite side beams of an automobile frame or chassis which is supported by front and rear axles 3 and 4, respectively, and ground wheels 5. Supported rigidly from the frame, at the front and rear ends, are bumpers, designated in their entireties by reference numerals 7 and 8, that are fixed to the frame through the intermediacy of brackets 9, or any other suitable means, whereby they will be held substantially rigid so as to give protection to the vehicle against damage by collision.

Each bumper, in its preferred form of construction, comprises upper and lower cross bars 10 and 11 disposed in vertically spaced, parallel relation and rigidly joined by connecting pieces 12 to which the brackets 9 are attached, and, disposed between the bars 10 and 11 of each bumper, is a sectional bar comprising opposite end sections 14 and 15 and an intermediate connection section 16. The end sections 14 and 15 are pivotally mounted at points toward their outer ends on pivot bolts 17 and 18 which extend between the upper and lower bumper bars and, at their inner ends, they are hingedly, or pivotally, attached by the pivot pins 19 and 20 to the opposite ends of the relatively short section 16. The two outer sections 14 and 15 are of substantially the same shape as the opposite end portions of the bars 10 and 11 between which they are disposed, so that when they are disposed in their retracted, or normal, positions they will lie even with the other bars. They are of such length, however, and are so connected at their inner ends to the short section 16 that when retracted their inner ends will move into an overlapped relation and the section 16 will fold in between them in the manner as shown in Figure 4.

For the purpose of actuating the movable parts of the front and rear bumpers between normal, retracted positions as shown in Figure 4, to extended positions, as shown in Figures 1 and 5, lever arms 22 are attached rigidly to the sections 15 just inside of the pivot bolt 18, and pivotally connected to these arms, are the ends of links 23 and 24 which extend in the longitudinal direction of the frame of the vehicle and are pivotally fixed, at their other ends, to the opposite ends of a rocker bar 25. This bar is mounted by a pivot 26 revolubly carried by a bracket 27 that is fixed to a cross beam 28 of the vehicle and the pivot is equipped with an upwardly opening, squared socket 29 for receiving the end of a crank 30 whereby the bar may be rocked to extend or retract the bumpers. A stop member 31 is fixed on the cross beam against which the bar 25 may swing to limit its movement and prevent its buckling back by moving beyond the position at which the bumpers are at their forward limit of extension. By so locating the stop 31 that the bar 25 may swing just past a dead center point between the pivot 26 and connection of the bar 23 with the arm 22, it will serve as a lock to prevent the retraction of the bumpers by a vehicle bumping into the extended parts. When the bumper parts are swung to retracted position, they are limited by their inward movement by cross pieces 34 that are fixed centrally between the upper and lower cross bars 10 and 11.

Assuming the bumpers to be so constructed and mounted, their use would be as follows: Normally, the extendible sections of the two bumpers are disposed in retracted positions and, in this capacity, they supplement the other bumper parts. After the vehicle has been parked the sections may be moved to extended positions, as shown in Figure 1, by actuation of the bar 25 by means of the crank 30 and, when so extended, sufficient space will be reserved in a parking line that the vehicle may be easily moved out after the parts have again been retracted.

It is readily apparent that various types of bumpers may be used other than the type herein illustrated and, for this reason, it is not desired that the claims limit the construction only to that herein illustrated, and described. It is also apparent that various ways of actuating the parts between retracted and extended positions may be employed and this may be done manually or mechanically by connection with a motor or the drive shaft of the engine.

Another feature of construction that is thought to be important is that the parts of the bumpers, when extended, present no projecting parts or corners on which other vehicles might be caught in parking or moving from a parking line; the sections of the extended bumpers lying substantially within the area of a semi-circle, of which the main part of the bumper is a diametric line.

I claim:

1. In a vehicle of the character described, a bumper comprising a rigidly mounted cross bar, a bar adjustably attached to the bumper and adapted to be adjusted from a position even therewith to a position a substantial distance forwardly thereof and means operable from within the vehicle for actuating the adjustable bar to and for retaining it in extended position.

2. In a vehicle of the character described, a bumper comprising a rigidly mounted cross bar, a sectional cross bar comprising opposite end sections that are pivotally attached near their outer ends to the opposite end portions of the rigid bar and means for swinging the inner ends of said end sections from between normal retracted positions even with the rigid bar to positions forwardly thereof.

3. In a vehicle of the character described, a bumper comprising rigidly mounted cross bars and a sectional cross bar comprising opposite end sections and a central section; said end sections having pivotal connection near their outer ends with the rigid bars so as to permit their swinging horizontally and having their inner ends pivotally connected to the ends of said central section, and means for swinging said sections from between normal retracted positions even with the rigid bars to positions forwardly thereof.

4. In a vehicle of the character described, a bumper comprising rigidly mounted cross bars and a sectional cross bar comprising opposite end sections pivotally attached at their outer ends to the outer ends of the rigidly mounted bars and adapted to swing from between normal retracted positions with their inner ends in overlapped relation even with the rigid bars to positions forwardly thereof and a central section pivotally connected at its ends to the inner ends of the end sections and adapted to fold in between their overlapped ends when they are retracted.

5. In a vehicle of the character described, a bumper comprising rigidly mounted cross bars and a sectional cross bar comprising opposite end sections pivotally attached at their outer ends to the outer ends of the rigidly mounted bars and adapted to swing from between normal retracted positions with their inner ends in overlapped relation even with the rigid bars to positions forwardly thereof and a central section pivotally connected at its ends to the inner ends of the end sections and adapted to fold in between their overlapped ends when they are retracted, a lever arm attached to one of said end sections, and a link connected therewith and with mechanism operable within the vehicle for actuating the pivoted sections between retracted and extended positions.

6. In a vehicle of the character described, bumpers mounted at the forward and rearward ends thereof, each embodying a rigid bar and an adjustable bar that is movable from a normal retracted position even with the rigid bar to a position extended forwardly thereof and means operable from within the vehicle for actuating said adjustable bars between retracted and extended positions.

7. In a vehicle of the character described, bumpers mounted at the front and rear ends thereof; each comprising rigidly mounted cross bars, and a sectional cross bar comprising opposite end sections that are pivotally attached at their outer ends to the outer ends of the rigidly mounted bars and adapted to swing from between normal, retracted positions with their inner ends in overlapped relation to positions forwardly thereof and a central section pivotally connected at its ends to the inner ends of said end sections and adapted to swing therewith when moved between extended and retracted positions, lever arms fixed to end sections of each of said bumpers, a rocker lever on the vehicle frame, links connecting the ends of the rocker lever with said arms, and a crank shaft for actuating the rocker lever to move the sectional cross bars between retracted and extended positions.

8. In a vehicle of the character described, a bumper comprising a rigidly mounted cross bar and an adjustable bar pivotally attached at its ends to the ends of the fixed bar and adapted to be extended at its center a substantial distance forwardly of the center of the fixed bar while its ends remain within the limits of the fixed bar.

9. In a vehicle of the character described a bumper comprising a rigid cross bar, and a sectional bar that is adapted to be adjusted from a normal retracted position even with the rigid bar to a forwardly extended position at which the sections thereof lie substantially within the periphery of a semicircle whose center is midway between the ends of the rigid cross bar.

Signed at Seattle, Washington, this 1st day of April, 1927.

WILLIAM GEORGE BLAKE.